United States Patent Office 3,475,363
Patented Oct. 28, 1969

3,475,363
ADHESIVE COMPOSITION
Robert J. Gander, Whitehouse, N.J., assignor to Johnson & Johnson, a corporation of New Jersey
No Drawing. Continuation-in-part of application Ser. No. 517,184, Dec. 23, 1965. This application Oct. 2, 1967, Ser. No. 672,000
Int. Cl. A61l *15/06;* C09j *3/14;* C08f *3/66*
U.S. Cl. 260—29.7                  14 Claims

ABSTRACT OF THE DISCLOSURE

Acrylate pressure-sensitive adhesives for skin adhesion are prepared by emulsion polymerization of dimethylaminoethyl methacrylate with an alkyl acrylate having an alkyl group of at least 6 carbon atoms. The dimethylaminoethyl methacrylate, which is present in amounts of between 10 to 25 percent by weight of the polymer, appears to neutralize the otherwise deleterious effects of the emulsifying agents thus avoiding the problem of long-term skin adhesion present with acrylate pressure-sensitive adhesives when prepared by emulsion polymerization. A small amount of cross-linking agent is included to give in the final polymer a toluene insoluble gel content of 15 to 65 percent by weight of the polymer. Latex viscosity is best controlled by the preferred method of polymerization wherein polymerization is initiated in an emulsion of at least 60 percent of the monomer required, the remaining monomer being added to the reaction, as a preformed emulsion of the monomers, as the reaction proceeds.

---

This is a continuation-in-part of application Ser. No. 517,184, filed Dec. 23, 1965, now abandoned.

This invention relates to pressure-sensitive adhesives and more particularly to pressure-sensitive adhesives and adhesive-coated products that are adapted to be secured to the human skin.

Acrylate pressure-sensitive adhesives have found increasing use where the adhesive is primarily designed for adherence to the skin due to the fact that the same are essentially single component adhesives and, accordingly, have less tendency towards possible irritation than multi-component adhesives such as the conventional rubber-base pressure-sensitive adhesives.

Although many acrylates can be used as pressure-sensitive adhesives and are found to have excellent tack and adherence to many different types of surfaces, it has been found that when adhered to a person's skin the adhesion to skin lessens substantially over a period of time. In many instances the adhesion after about 24 hours is so poor that adhesive tape prepared with such acrylate pressure-sensitive adhesives may even fall off the skin of a patient despite the fact that adherence to inanimate surfaces is still good even several days after application. The term "pressure-sensitive surgical adhesive" is, accordingly, used herein to distinguish over adhesives not generally suitable for application to the skin and refers to pressure-sensitive adhesives that are adapted to be used in contact with the human skin although not limited to such use.

Surgical pressure-sensitive adhesive sheet products, as the term is herein used, include any product having a flexible backing and a pressure-sensitive adhesive coating thereon and includes, although it is not limited to, such products as adhesive tapes, adhesive bandages, adhesive plasters, adhesive-coated surgical operating sheets, adhesive-coated corn pads, adhesive-coated absorbent dressings, and the like.

The acrylate pressure-sensitive adhesives heretofore available which were satisfactory with respect to adherence to the skin have all been solvent polymerized. There are many advantages, however, to being able to make the adhesive polymers through emulsion polymerization rather than solvent polymerization. One important advantage is that in emulsion polymerization the polymer can be cross-linked during the polymerization reaction thus making it unnecessary to depend on later cross-linking after the adhesive has been applied to the backing as is the case where solvent polymerization is employed. Also, emulsion polymerization is less expensive than solvent polymerization as water is the medium in which the polymerization reaction occurs. There are also no problems of solvent recovery which must be considered where solvent polymerization is used.

Although adhesive acrylate copolymers can be readily polymerized in emulsion form, the difficulty heretofore has been that the adhesive polymer so obtained has very poor long-term skin adhesion. This is probably due to the presence of emulsifying agents which must be included in order to carry out the emulsion polymerization. A further difficulty with emulsion polymerized acrylate copolymer adhesives previously encountered was that in order to obtain a latex sufficiently viscous to permit spreading on absorbent or porous substrates, such as fabric tape backings, it has been necessary to add thickeners to the latex. These thickeners are also water sensitive, as are the emulsifiers, and tend to further interfere with the skin adhesion of the resulting polymer adhesive.

It is, accordingly, an object of the present invention to prepare acrylate pressure-sensitive adhesives having good skin adherence through emulsion polymerization. Another object of the present invention is to prepare acrylate pressure-sensitive adhesives through emulsion polymerization which are sufficiently thick or viscous in the latex form to permit spreading on porous backings without the inclusion of a thickening agent. A still further object of the present invention is to prepare a new class of pressure-sensitive adhesives having good skin adhesion which are stable latices. Other objects and advantages will become apparent from the following description taken in connection with the specific examples wherein are set forth by way of illustration and example certain embodiments of this invention.

I have discovered that acrylate pressure-sensitive adhesives can be prepared through emulsion polymerization in the presence of conventional emulsifiers without any deleterious effect on the skin adhesion if there is used as one of the monomers in preparing the acrylate pressure-sensitive adhesive polymer dimethylaminoethyl methacrylate. The dimethylaminoethyl methacrylate appears in some manner to counteract the otherwise harmful effect of the emulsifying agents. In preparing the polymers of the present invention, the dimethylaminoethyl methacrylate is polymerized with an alkyl acrylate having an alkyl group of at least six carbon atoms and preferably in the range of about six to ten carbon atoms. Some illustrative examples of suitable alkyl acrylate monomers are 2-ethylhexyl acrylate, and the heptyl, octyl, nonyl, and decyl acrylates. The preferred alkyl acrylate monomer is 2-ethylhexyl acrylate.

A small amount of cross-linking agent must be included in the polymerization reaction otherwise the adhesive polymer obtained is too soft to make satisfactory pressure-sensitive adhesives particularly for skin application. Cross-linking agents of the class glycol diacrylates and glycol dimethacrylates have been found to be particularly good for this purpose. Examples of such cross-linking agents are: triethyleneglycol dimethacrylate and tetramethyleneglycol diacrylate. Only small amounts of the cross-linking agent are necessary to substantially improve the hardness of the adhesive. Thus, for example, a copolymer of 80 percent 2-ethylhexyl acrylate and 20 percent dimethylaminoethyl methacrylate made in emulsion has a standard Williams plasticity of only about 0.9 mm. An inclusion of only 0.19 percent of triethyleneglycol dimethacrylate, based on the weight of the reactants, is sufficient to raise the plasticity from 0.9 mm. to about 2.1 mm., a hardness satisfactory for many surgical applications. Harder masses are obtained by increasing the concentration of the bifunctional cross-linking monomer.

Pressure-sensitive adhesive masses should have a plasticity of at least about 1.5 mm. Where plasticity of a mass is referred to in the present specification and claims, the plasticity is the Williams plasticity. Williams plasticity is determined as the height of a 2.00-gram pellet of adhesive after it has been pressed between the plates of a parallel-plate plastometer, bearing a five kilogram load, for 15 minutes at 100° F. As previously indicated such masses cannot be obtained when using the dimethylaminoethyl monomer without including in the reaction a small amount, generally not less than .05 percent by weight based on the monomers present, of a cross-linking agent. The plasticity of the masses, however, should generally not exceed about 3.0 mm. As the degree of cross-linking is indicated by the insoluble gel content in the pressure-sensitive adhesive polymer, another way of stating this is that the toluene insoluble gel content of the pressure-sensitive adhesive polymer should generally be within the range of about 15 to 65 percent by weight of the polymer.

The extent of cross-linking will vary somewhat depending on the particular crosslinking agent used, some giving a somewhat greater insoluble gel content for the same amount of cross-linking agent than others. However, generally the cross-linking agent should be present in amounts of about 0.05 percent to 0.55 percent by weight of the monomers present to give an insoluble gel content of about 15 to 65 percent and in amounts of about .1 to .2 percent by weight of the monomers where, for example, the cross-linking agent is triethylene glycol dimethacrylate to give a gel content of about 30 to 50 percent by weight. Adhesive masses which seem to have the best balance of properties such, for example, with respect to tack, skin adhesion, and cohesive strength have standard plasticities of between 1.8 and 2.5 mm., and insoluble gel contents of about 30 to 50 percent by weight of the polymer.

The amount of dimethylaminoethyl methacrylate present in the monomer mixture is critical in making the latex adhesives of the present invention. The polymer yields fall off sharply if the dimethylaminoethyl methacrylate is increased from about 20 to 25 percent by weight of the monomers present. If the amount of dimethylaminoethyl methacrylate present is increased to above 25 percent, complete coagulation of the latex occurs during the polymerization. When the dimethylaminoethyl methacrylate content is dropped to only 10 percent, the viscosity of the latex obtained is quite low. The viscosity is found to be only about 40 centipoises where the amount of the dimethylaminoethyl methacrylate is reduced to 10 percent of the monomer content. Although the pressure-sensitive adhesive coating obtained from spreading and drying such latices still has the advantageous adhesion characteristics with respect to mass surfaces the viscosity is so low as to preclude most practical uses of the latex, such for example as the coating of fabrics.

Accordingly, in practicing the present invention the dimethylaminoethyl methacrylate concentration is preferably maintained in the range of about 15 to 22 percent of the total monomer mix.

One interesting aspect of the latices obtained in the practice of the present invention is that the viscosity of the latices can be substantially varied without the inclusion of any thickening agents. The viscosities are controlled by the manner in which the reaction is carried out and by the concentration of cross-linking agent. This is well illustrated by the table of Example II. With the polymer latices of the present invention utilizing a given concentration of cross-linking agent, it has been found that the viscosity of the final latex obtained can be varied substantially by the manner of adding the reactants. The viscosity is controlled by initiating the polymerization with only a portion of the monomers in the polymerization vessel; an emulsion containing the balance of the reactants is then added to the polymerization vessel after some polymerization has occurred. It is believed that this variation in the viscosities of the latices obtained is due to a variation in the particle size obtained through following this procedure, the larger particle size latices giving lower viscosities and the smaller particle size latices giving higher viscosities. Thus, in preparing a polymer such as that described above, with 0.19 percent triethyleneglycol dimethacrylate based on the monomers, by carrying out the reaction in such manner that the original charge contains only about 67 percent of the total reactants, a final latex is obtained having a Brookfield viscosity of 1,700 to 2,600 cps. (Wherever viscosities are given in the present specification and claims, they are Brookfeld viscosities at a spindle speed of 20 r.p.m. and a temperature of 25° C.) However, when the initial charge is increased to about 80 percent of the reactants, the viscosity of the final latex increases to about 5,500 to 9,500 centipoises.

If the original charge used is 67 percent of the total, and the cross-linking agent is varied in the series of runs, the latex viscosity is found to increase with increasing concentration of cross-linking agent. Brookfield viscosities of 1,700 to 2,600 centipoises are obtained with 0.19 percent triethyleneglycol dimethacrylate, 4,800 to 6,600 centipoises with 0.25 percent, and 10,000 to 14,000 centipoises with 0.32 percent. Although the pressure-sensitive adhesives and latices of the present invention can be prepared by a one step polymerization process, the preferred method of preparation is that referred to in which the polymerization action is started with an emulsion containing at least 60% of the monomers in approximately their ratio in the final polymer, and then after polymerization has been initiated a pre-emulsion of the remaining monomers is added in a stepwise fashion as the polymerization proceeds. In the preferred practice the initial charge has a larger water to monomer ratio than that of the pre-emulsion mix that is added as the reaction proceeds. This enables better control of the polymerization exotherm. This is illustrated by Examples I and II.

The adhesives of the present invention possess excellent tack and high internal strength associated with their cross-linked structure. In addition they can be prepared by emulsion polymerization. In addition to extraordinary tack, which I am inclined to attribute to the dimethylamino groups, these masses exhibited low mass transfer to skin and other surfaces because of the high internal strength associated with their cross-linked structures.

An inherent advantage of the emulsion method for making a cross-linked mass is that the cross-linking is built into the polymer at the time of polymerization. No post-curing of spread mass is necessary, as is the case for solution-polymerized adhesives. Water emulsions of the cross-linked adhesives are perfectly fluid systems, while solvent solutions of cross-linked adhesives are intractable gels.

Another advantage of the cross-linked polymer latices of the present invention is that the latex particle size can be regulated to give a Brookfield viscosity of 5,000 to 10,000 centipoises without the addition of thickening agents. A latex of this high viscosity is an excellent medium for applying an acrylate adhesive to porous webs without penetration. The fact that this desirable high viscosity is obtained during polymerization without recourse to water-sensitive thickening agents, such as sodium polyacrylates or hydroxyethyl-cellulose, is a distinct advantage. As previously indicated, water-soluble agents, such as emulsifiers and thickeners, do worsen the skin adherence of a pressure-sensitive adhesive. This is a major reason why most emulsion-polymerized polymers make poor pressure-sensitive adhesives for skin application.

The following examples are given for the purpose of further illustrating the practice of the present invention. The examples are for the purpose of illustration only, and the invention is not limited thereto.

EXAMPLE I

A 5-liter, 3-neck, round-bottom flask is fitted with "Teflon"-blade stirrer, a water-condenser, a thermometer, a nitrogen inlet tube, and two separatory funnels. One separatory funnel has a capacity of at least 300 ml. and the other at least 25 ml. To the flask the following ingredients, representing 80 percent of the charge are added:

| | |
|---|---|
| Duponol ME, g. (sodium lauryl sulfate) | 10.0 |
| $Na_2HPO_4$, g. | 1.0 |
| Igepal CO–430, g. (a condensation product of one mol of nonyl phenol and two mols of ethylene oxide) | 19.0 |
| Water, cc. | 940.0 |
| Triethyleneglycol dimethacrylate (TEGDM), g. | [1]1.10 |
| 2-ethylhexyl acrylate (EHA), g. | [1]480.0 |
| Dimethylaminoethyl methacrylate (DMAEMA), g. | 120.0 |
| Potassium persulfate, g. | [2]2.2 |

[1] Solution.
[2] Dissolved in 100 cc. of water.

When all the ingredients are in the flask, a slow nitrogen flow is started over the surface of them. Nitrogen flow is continued throughout the full 5-hour reaction period. The flask is swept out without stirring for 15 to 20 minutes. During this time the lower aqueous layer turns a yellow color.

The flask is then immersed in an electrically-heated oil bath at 60° C. Stirring of the ingredients is begun at a slow rate (75–100 r.p.m.). The temperature of the reaction is allowed to rise to 66° C. during about 20 minutes by gradually raising the temperature of the oil bath to about 72° C. The emulsion thickens noticeably during the time the temperature rises from 55 to 66° C. When the temperature reaches 66° C., addition of an emulsion, made up of the remaining 20 percent of the ingredients, is started. The emulsion is added as a thin stream from the 300-cc. separatory funnel during a period of 15 to 20 minutes. There is very little exotherm during the addition of the emulsion, and the temperature is maintained in the range of 63 to 66° C., by intermittent heating.

The emulsion containing the remaining 20 percent of the ingredients which was added during the reaction is prepared in a 1-liter flask just before use by mechanically stirring the following ingredients for 10 minutes under a flow of nitrogen. This emulsion is stable and shows no sign of separation during the time it is being added.

| | |
|---|---|
| Water, cc. | 130 |
| Duponol ME, g. | 2.5 |
| Igepal CO–430, g. | 4.8 |
| $Na_2HPO_4$, g. | 0.2 |
| 2-ethylhexyl acrylate, g. | [1]120 |
| Triethyleneglycol dimethacrylate, g. | [1]0.30 |
| Dimethylaminoethyl methacrylate, g. | 30 |

[1] Solution.

As soon as the emulsion is in, a freshly-prepared solution of 2.2 g. of potassium persulfate in 25 cc. of warm (50–55° C.) water is added dropwise to the latex from the small separatory funnel. The oil bath is removed from the flask during the persulfate addition. As the persulfate is put in, the reaction temperature slowly rises from about 63° C., reaching a peak of about 72° C. in about 10 minutes. The oil bath is not replaced until the reaction temperature has declined to 60° C. Heating at 60° C., stirring, and sweeping with nitrogen is continued for a total period of 5.0 hours, reckoned from the time the reaction first reaches 66° C. The hot latex is filtered through a single layer of 32 x 28 gauze and stirred very slowly as it cools to room temperature.

The latex has a Brookfield viscosity of 5,900 centipoises (20 r.p.m., 25° C.), a solids content of 33.7 percent, and a pH of 8.7. Polymer recovered by drying a film of the latex for one hour at 80° C. has a standard Williams plasticity of 2.13 mm. and a gel content of 28 percent.

Standard plasticity is defined as the height of a 2.00-gram pellet of polymer after being subjected to a load of 5 kg. for 14 minutes at 100° F. Gel content is defined as the toluene-insoluble material which does not pass through a 100 mesh screen. Polymer (0.500 gram) is allowed to stand at room temperature undisturbed in 50 cc. of toluene for 48 hours, and the solution is then filtered through a screen.

The latex is spread in a smooth coat on 180 x 54 rayon acetate taffeta cloth backing and dried. The dried polymer on the cloth amounts to 2.0 to 2.5 ounces per square yard. Rolls of tape of various widths, from ½ inch to 4 inches, are prepared. The tape unwinds readily, ages well, and exhibits excellent tack. Wear tests, in which 1 x 3-inch strips of tape are worn on upper arms, show that the long-term skin adherence is good and that the tape is removed from the skin with very little adhesive transfer from tape to skin.

EXAMPLE II

In the apparatus of Example I the following ingredients, representing 67 percent of the charge, are added:

| | |
|---|---|
| Duponol ME, g. | 7.0 |
| $Na_2HPO_4$, g. | 0.8 |
| Igepal CO–430, g. | 16.0 |
| Water, cc. | 850 |
| Triethyleneglycol dimethacrylate, g. | [1]0.95 |
| 2-ethylhexyl acrylate, g. | [1]400 |
| Dimethylaminoethyl methacrylate, g. | 100 |
| Potassium persulfate, g. | [2]2.2 |

[1] Solution.
[2] Dissolved in 100 cc. of water.

The procedure of Example I is followed except that the flask is immersed in an oil bath at 45° C. The temperature of the reaction is allowed to rise to 66° C. during a period of about 35 minutes by gradually raising the temperature of the oil bath to about 72° C. When the temperature reaches 66° C., addition of an emulsion, made up of the remaining 33 percent of the ingredients, is started. After about 250 cc. of the emulsion has been added, a solution of 2.2 g. of potassium persulfate in 25 cc. of warm (50–55° C.) water is added dropwise. The oil bath is removed from the flask during the persulfate addition. The addition of the remainder of the emulsion is continued simultaneously. The emulsion is prepared by the method of Example I according to the following recipe:

| | |
|---|---|
| Water, cc. | 320 |
| Duponol ME, g. | 5.5 |
| Igepal CO–430, g. | 7.8 |
| $Na_2HPO_4$, g. | 0.4 |
| 2-ethylhexyl acrylate g. | [1]400 |
| Triethyleneglycol dimethacrylate, g. | [1]0.45 |
| Dimethylaminoethyl methacrylate, g. | 50 |

[1] Solution.

The remainder of the reaction is carried out as in Example I. The latex has a Brookfield viscosity of 2,100 centipoises (20 r.p.m., 25° C.), a solids content of 33.7 percent, and a pH of 8.7. The dried polymer has a Williams plasticity of 2.07 mm. and a gel content of 30 percent.

Following the procedures of Examples I and II, latices are prepared using varying amounts of triethyleneglycol dimethacrylate cross-linking agent. The results are summarized in the table and illustrate that viscosity can be controlled by either the manner of carrying out the reaction or by varying the amount of cross-linking agent. The viscosity of the latex is dependent both on the amount of monomer present in the original charge and on the concentration of cross-linker.

TABLE

| TEGDM, percent on monomers | Monomers In Original Charge, percent | Solids, percent | Standard Plasticity, mm. | Brookfield Visc., cps. at 20 r.p.m. | Gel Content, percent |
|---|---|---|---|---|---|
| 0.19 | 67 | 33.7 | 2.07 | 2,100 | 30 |
| 0.19 | 80 | 34.2 | 2.05 | 7,650 | 34 |
| 0.25 | 67 | 33.3 | 2.44 | 4,900 | 39 |
| 0.25 | 80 | 34.9 | 2.36 | 10,600 | 42 |
| 0.32 | 67 | 34.5 | 2.57 | 10,100 | 42 |

EXAMPLE III

This is an example of a cross-linked copolymer of 75 percent 2-ethylhexyl acrylate and 25 percent vinyl acetate which is emulsion polymerized using the Duponol ME and Igepal CO–430 emulsifier system. In the apparatus of Example I the following reactants are charged:

| | |
|---|---|
| Duponol ME, g. | 16.7 |
| Igepal CO–430, g. | 33.3 |
| Water, cc. | 800 |
| 2-ethylhexyl acrylate, g. | 188 |
| Vinyl acetate, g. | 188 |
| 60% aqueous N-methylolacrylamide, g. | 1.9 |
| Trichloroethylene, g. | 1.4 |

The reactants are stirred and the apparatus flushed with nitrogen while heating to 60° C. during about 20 minutes. When the temperature reaches 60° C., a solution of 1.1 g. of potassium persulfate in 50 cc. of water and a solution of 1.1 g. of sodium meta-bisulfite in 50 cc. of water are added rapidly. The oil bath is removed and the temperature is maintained at about 65 to 70° C. by intermittent cooling in an ice water bath. The addition of the remainder of the 2-ethylhexyl acrylate (374 grams) is started in a thin stream from a separatory funnel. When about 150 cc. of 2-ethylhexyl acrylate has been added, solutions of 0.6 g. of potassium persulfate in 25 cc. of water and 0.6 g. of sodium meta-bisulfite in 25 cc. of water are used to wash in 1.9 g. of 60 percent aqueous N-methylolacrylamide. When all the acrylate monomer is in, a final addition is made of 0.6 g. potassium persulfate in 25 cc. of water and 0.6 g. sodium meta-bisulfite in 25 cc. of water. The flask is then replaced in the oil bath, nitrogen flow is discontinued, and the temperature is maintained at 65–70° C. for 2.5 hours longer.

The latex has a Brookfield viscosity of 40 centipoises (20 r.p.m., 25° C.), a solids content of 43.3 percent, and a pH of 2.5. The pH of the latex is raised to 5.8 by neutralizing it with 1.0 N sodium hydroxide solution. The viscosity of the neutralized latex increases slowly and after four days reaches 3,900 centipoises. The latex is coated on 180 x 54 rayon acetate taffeta cloth backing, giving dry copolymer weights of 2.5 ounces per square yard. The standard plasticity of the dry copolymer is 2.04 mm.

While the tack of the EHA-ViAc copolymer adhesive is good, its long-term skin adherence is poor. This is demonstrated by results of a wear test on 25 subjects who wore 1 x 3-inch tapes on their upper arms for a 24-hour period.

| Adhesive | Skin Adherence, percent | Mass Transfer to Skin |
|---|---|---|
| EHA-DMAEMA copolymer of Example I | 83 | 6 |
| EHA-ViAc copolymer of Example III | 59 | 7 |

EXAMPLE IV

A latex is prepared according to the directions of Example II except that tetramethyleneglycol diacrylate cross-linking agent is substituted for triethyleneglycol dimethacrylate. The latex has a Brookfield viscosity of 12,600 centipoises (20 r.p.m., 25° C.), a solids content of 34.7 percent, and a pH of 8.7. The dried polymer has a Williams plasticity of 3.04 mm. and a gel content of 63 percent.

Having thus described my invention, I claim:

1. A pressure-sensitive adhesive in latex form comprising a cross-linked copolymer consisting, except for the presence of cross-linking agent of dimethylaminoethyl methacrylate and an alkyl acrylate having an alkyl group of at least six carbons, said copolymer having a toluene insoluble gel content of at least 15 percent by weight and containing in copolymerized form between 10 to 25 percent by weight dimethylaminoethyl methacrylate based on the weight of the copolymer and said latex having a Brookfield viscosity of at least 40 centipoises.

2. A pressure-sensitive adhesive latex of claim 1 in which said alkyl group of said alkyl acrylate has six to ten carbons.

3. A pressure-sensitive adhesive latex of claim 2 in which the dimethylaminoethyl methacrylate is present in copolymerized form in an amount of 15 to 22 percent by weight of the copolymer.

4. A pressure-sensitive adhesive latex of claim 3 in which the toluene insoluble gel content is within the range of 30 to 50 percent by weight of copolymer.

5. A pressure-sensitive adhesive comprising a cross-linked copolymer containing in copolymerized form, between 10 to 25 percent by weight of dimethylaminoethyl methacrylate and an alkyl acrylate having an alkyl group of at least six carbons, said pressure-sensitive adhesive having a standard Williams plasticity of about 1.5 to 3.0 mm. and a toluene insoluble gel content of at least 15 percent by weight, said copolymer consisting, except for the presence of cross-linking agent, of said dimethylaminoethyl methacrylate and said alkyl acrylate.

6. A pressure-sensitive adhesive of claim 5 in which said alkyl group of said alkyl acrylate has six to ten carbons.

7. A pressure-sensitive adhesive of claim 6 having a toluene insoluble gel content of 15 to 65 percent by weight.

8. A pressure-sensitive adhesive of claim 6 containing in copolymerized form 15 to 22 percent by weight dimethylaminoethyl methacrylate.

9. A pressure-sensitive adhesive of claim 8 in which the toluene insoluble gel content is within the range of 30 to 50 percent by weight of the copolymer.

10. A pressure-sensitive adhesive of claim 5 in the form of a coating adhered to at least one side of a flexible backing to form an adhesive sheet, the adherence between said pressure-sensitive adhesive coating and said backing being such that the adhesive coating remains adhered to said backing when said backing is adhered to the skin of an individual through pressing the adhesive containing surface of said backing against the skin and then removed by peeling the adhesive-coated backing from said skin.

11. A pressure-sensitive adhesive of claim 10 in the form of a coating on a flexible backing, the adhesive containing in copolymerized form 15 to 22 percent by weight dimethylaminoethyl methacrylate and a toluene insoluble gel content of 30 to 50 percent by weight of said adhesive.

12. The method of making an acrylate pressure-sensitive adhesive latex copolymer consisting, except for the presence of cross-linking agent of between 10 to 25 percent by weight dimethylaminoethyl methacrylate and 75 to 90 percent by weight alkyl acrylate in interpolymerized form, the alkyl group of the alkyl acrylate having at least 6 carbon atoms, comprising preparing a polymerizable water base emulsion containing a cross-linking agent and at least 60 percent by weight of the total monomers to be used the monomers being present in a ratio of approximately that to be found in the final polymer, initiating polymerization of said polymerizable water base emulsion and then adding thereto, during polymerization, a water base emulsion containing the remainder of said monomer and continuing polymerization between said monomers to completion of said copolymer.

13. The method of claim 12 in which sufficient cross-linking agent is included in said water base emulsions to give, in the final copolymer, a toluene insoluble gel content of 30 to 50 percent by weight of the copolymer.

14. The method of claim 13 in which the water to monomer ratio in said initial emulsion in which polymerization is initiated is substantally greater than the water to monomer ratio of said emulsion added during the polymerization reaction.

References Cited

UNITED STATES PATENTS

| | | |
|---|---|---|
| 2,949,443 | 8/1960 | Merriam et al. _____ 260—80.73 |
| 3,078,185 | 2/1963 | Kine et al. |
| 3,299,010 | 1/1967 | Samour. |

MURRAY TILLMAN, Primary Examiner

W. J. BRIGGS, Sr., Assistant Examiner

U.S. Cl. X.R.

117—122; 156—331; 260—29.6, 80.73, 86.1